United States Patent
Itagaki

(10) Patent No.: US 9,739,321 B2
(45) Date of Patent: Aug. 22, 2017

(54) SELECTABLE ONE-WAY CLUTCH

(71) Applicant: TOYOTA JIDOSHA KABUSHIKI KAISHA, Toyota-shi, Aichi-ken (JP)

(72) Inventor: Kenji Itagaki, Shizuoka-ken (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 15/094,031

(22) Filed: Apr. 8, 2016

(65) Prior Publication Data
US 2016/0305495 A1    Oct. 20, 2016

(30) Foreign Application Priority Data

Apr. 14, 2015 (JP) .................. 2015-082579

(51) Int. Cl.
- *F16D 41/12* (2006.01)
- *B60K 6/38* (2007.10)
- *F16D 41/14* (2006.01)
- *B60K 6/00* (2006.01)

(52) U.S. Cl.
CPC .............. *F16D 41/125* (2013.01); *B60K 6/00* (2013.01); *F16D 41/14* (2013.01)

(58) Field of Classification Search
CPC ....................................................... F16D 41/14
See application file for complete search history.

(56) References Cited

U.S. PATENT DOCUMENTS

| 5,937,980 A * | 8/1999 | Dick ................... B60K 17/3505 192/43.1 |
| 7,766,790 B2 * | 8/2010 | Stevenson ................ B60K 6/26 192/43.1 |
| 8,418,825 B2 * | 4/2013 | Bird ....................... F16D 41/125 192/46 |
| 2009/0159391 A1 | 6/2009 | Eisengruber |

FOREIGN PATENT DOCUMENTS

| JP | 2002-514292 A | 5/2002 |
| JP | 2011-508167 A | 3/2011 |
| WO | 98/49456 A1 | 11/1998 |
| WO | 2009085569 A1 | 7/2009 |

* cited by examiner

*Primary Examiner* — Mark Manley
(74) *Attorney, Agent, or Firm* — Andrews Kurth Kenyon LLP

(57) ABSTRACT

A selectable one-way clutch comprises inside clutch elements and outside clutch elements. The inside clutch elements include: an inside pocket plate where inside pawl members are held; an inside notch plate where inside recesses to engage with the inside pawl members are formed; and an inside selector plate disposed between the inside pocket plate and the inside notch plate. The outside clutch elements include: an outside pocket plate where outside pawl members are formed; an outside notch plate where outside recesses to engage with the outside pawl members are formed; and an outside selector plate disposed between the outside pocket plate and the outside notch plate. The inside clutch elements and the outside clutch elements are disposed concentrically using one axial line as a center.

4 Claims, 8 Drawing Sheets

SELECTABLE ONE-WAY CLUTCH

CROSS-REFERENCE TO RELATED APPLICATION

The present application claims priority to Japanese Patent Application No. 2015-082579 filed on Apr. 14, 2015, which is incorporated herein by reference in its entirety.

TECHNICAL FIELD

The present invention relates to a selectable one-way clutch which is capable of performing selectively a function of a one-way clutch.

BACKGROUND ART

As a selectable one-way clutch, known is such a selectable one-way clutch that a plate where pawl members are provided protrudably and a plate where recesses are formed for engaging with the pawl members respectively are provided on a shared axial line, and by changing the state of the pawl members by a selector plate provided between the two plates, a mode with respect to torque transmission between the two plates is selectable from either a lock mode where the torque transmission is allowed only when a rotational direction is a predetermined one direction or a release mode where the torque transmission is blocked regardless of the rotational direction (the patent literature 1).

CITATION LIST

Patent Literature

Patent literature #1: JP2002-514292A.

SUMMARY OF INVENTION

Technical Problem

The selectable one-way clutch of the patent literature 1 is capable of changing the state of torque transmission of a shaft fixed to the plate by switching the mode between the lock mode and the release mode. However, in a case where, in order to change a state of torque transmission of each of a plurality of shafts disposed on the same axial line, the selectable one-way clutches are disposed for the plurality of shafts respectively, it is compelled to dispose the selectable one-way clutches in an axial direction. Due to this, it is necessary to make spaces for arranging a plurality of selectable one-way clutches in the axial direction. Accordingly, a freedom degree of disposition with respect to the axial direction is not high.

Based on the above problem, the present invention aims to provide a selectable one-way clutch where the freedom degree of disposition with respect to an axial direction is improved.

Solution to Problem

One aspect of the present invention is a selectable one-way clutch comprising inside clutch elements and outside clutch elements, the inside clutch elements including a first inside plate and a second inside plate which are disposed on a shared axial line with each other, and the inside clutch elements being switchable between a lock mode where torque transmission from the second inside plate to the first inside plate is allowed in a case where a rotational direction of the second inside plate is a predetermined direction and the torque transmission is blocked in a case where the rotational direction is an opposite direction to the predetermined direction; and a release mode where the torque transmission from the second inside plate to the first inside plate is blocked in either case where the rotational direction of the second inside plate is the predetermined direction or the opposite direction, and the outside clutch elements including a first outside plate and a second outside plate which is in a hollow-shape, the first outside plate being located on an outer circumferential side of the first inside plate; disposed on the shared axial line; and provided integrally or disintegrally with the first inside plate, and the second outside plate being located on an outer circumferential side of the second inside plate; and disposed on the shared axial line, and the outside clutch elements being switchable between a lock mode where torque transmission from the second outside plate to the first outside plate is allowed in a case where a rotational direction of the second outside plate is a predetermined direction and the torque transmission is blocked in a case where the rotational direction is an opposite direction to the predetermined direction; and a release mode where the torque transmission from the second outside plate to the first outside plate is blocked in either case where the rotational direction of the second outside plate is the predetermined direction or the opposite direction, wherein the inside clutch elements and the outside clutch elements are disposed coaxially using the shared axial line as a center.

According to the selectable one-way clutch, there is no increase in size with respect to the axial direction which would occur in a case where the two kinds of clutch elements are arranged in an axial direction. Thereby, the freedom degree of disposition with respect to the axial direction is improved

DESCRIPTION OF EMBODIMENTS

Figure 1:
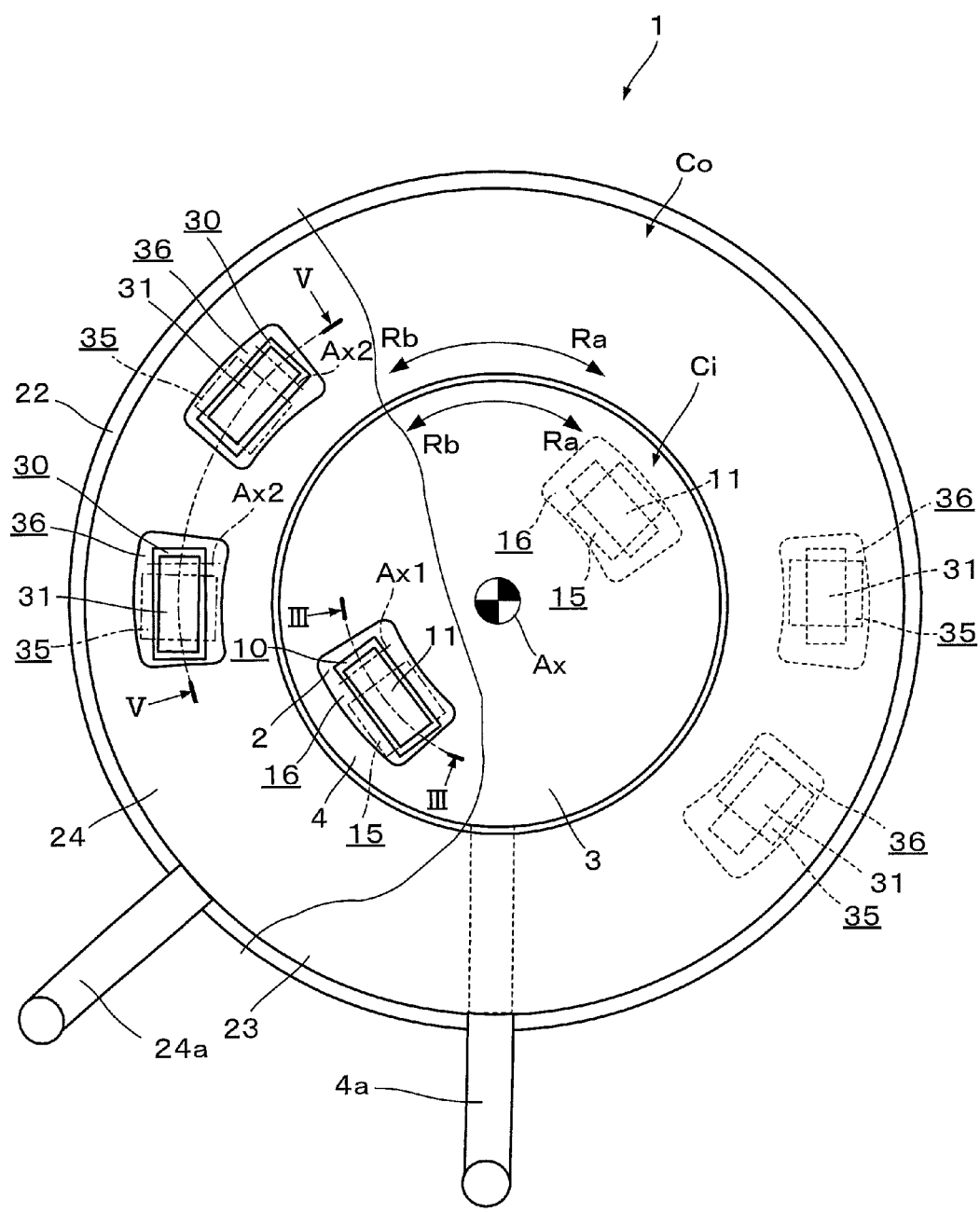
FIG. 1 shows a selectable one-way clutch according to one embodiment of the present invention.

A selectable one-way clutch 1 shown in FIGS. 1 to 6 (hereinafter, referred to as the clutch 1) is configured by a combination of two clutch elements Ci and Co which are disposed concentrically by using a shared axial line Ax as a center.

The inside clutch elements Ci include: an inside pocket plate 2 and an inside notch plate 3 which are disposed on the shared axial line Ax; and an inside selector plate 4 disposed between the inside pocket plate 2 and the inside notch plate 3, the inside selector plate 4 being rotatable around the axial line Ax. The inside pocket plate 2 corresponds to a first inside plate of the present invention, and the inside notch plate 3 corresponds to a second inside plate.

Figure 3:
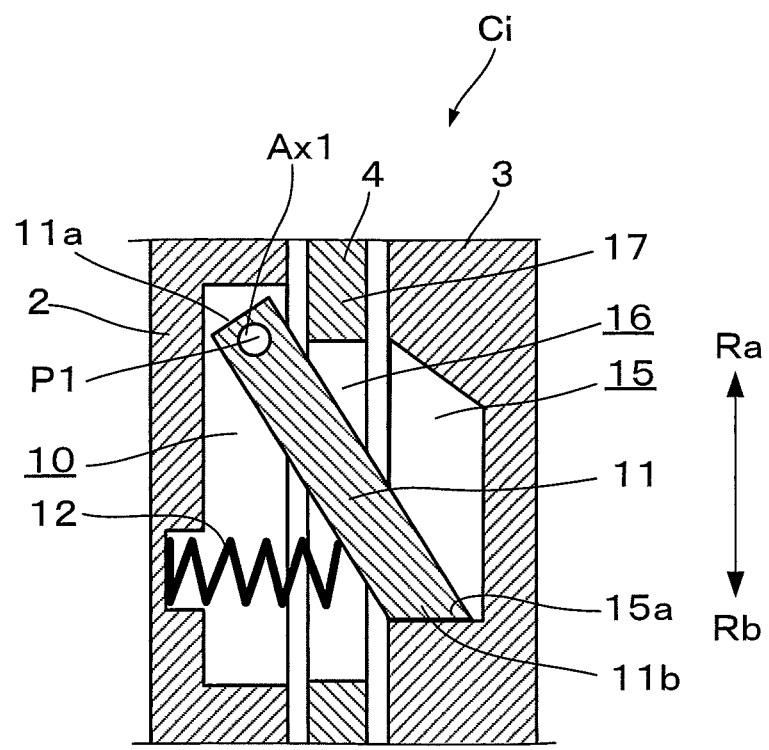
FIG. 3 is a sectional view with respect to a line shown in FIG. 1 at the time of a lock mode of inside clutch elements.
Figure 4:
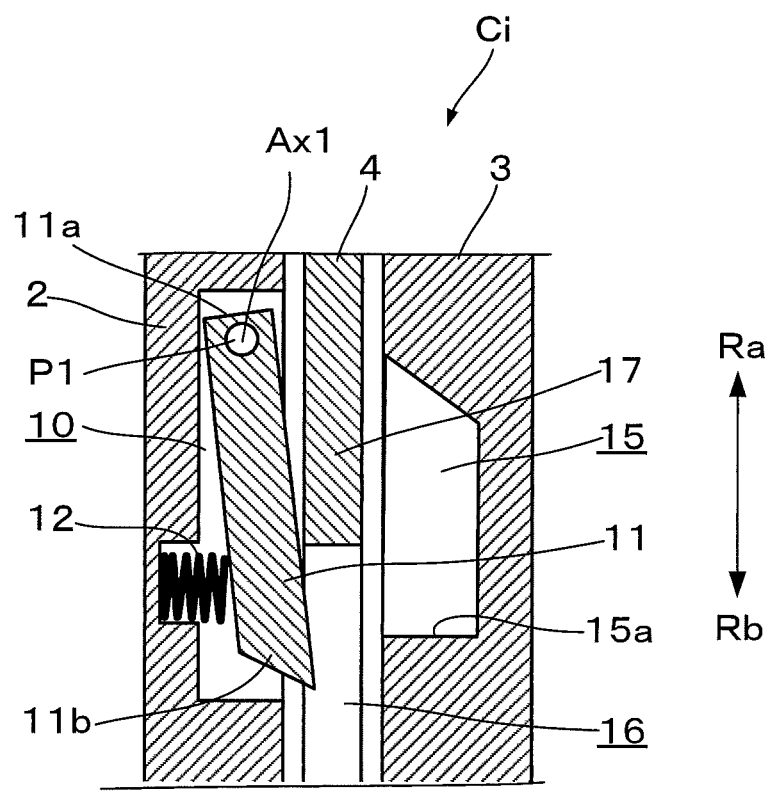
FIG. 4 is a sectional view with respect to the line shown in FIG. 1 at the time of a release mode of the inside clutch elements.

As shown in FIGS. 3 and 4, on the inside pocket plate 2, a plurality of inside holding pockets 10 are formed, the plurality of inside holding pockets 10 opening at the side facing the inside notch plate 3 and being arranged in a circumferential direction. For each of the plurality of inside holding pockets 10, a single inside pawl member 11 which engages with the inside notch plate 3 is provided. Each of the inside pawl members 11 is provided via a spindle P1 to the inside pocket plate 2, so that a base end section 11a is allowed to rotate around an axial line Ax1 extending in a radial direction of the inside pocket plate 2. Also, each of the inside pawl members 11 is biased by a spring 12 in a protrusion direction heading to the inside notch plate 3 side. Thereby, each of the inside pawl members 11 is capable of moving between a state that the inside pawl member 11 backs to the inside pocket plate 2 side and housed in the inside holding pocket 10 and a state that the inside pawl member 11 protrudes toward the inside notch plate 3 from the inside pocket plate 2. That is, each of the inside pawl members 11 is provided to the inside pocket plate 2 protrudably.

On the inside notch plate 3, a plurality of inside recesses 15 are formed, the plurality of inside recesses 15 opening at the side facing the inside pocket plate 2 and being arranged in a circumferential direction. Each of the plurality of inside recesses 15 has a wall portion 15a, where a tip section 11b of the inside pawl member 11 abuts when the inside recess 15 engages with the inside pawl member 11 which is protruding. In each figure, the inside recesses 15 are not shown accurately in the number thereof. However, the number of inside recesses 15 is more than the number of inside pawl members 11. A phase of the each inside recess 15 and a phase of each inside pawl member 11 are different from each other. Accordingly, a part of the protruding inside pawl members 11 engage with a part of the inside recesses 15.

Figure 2:
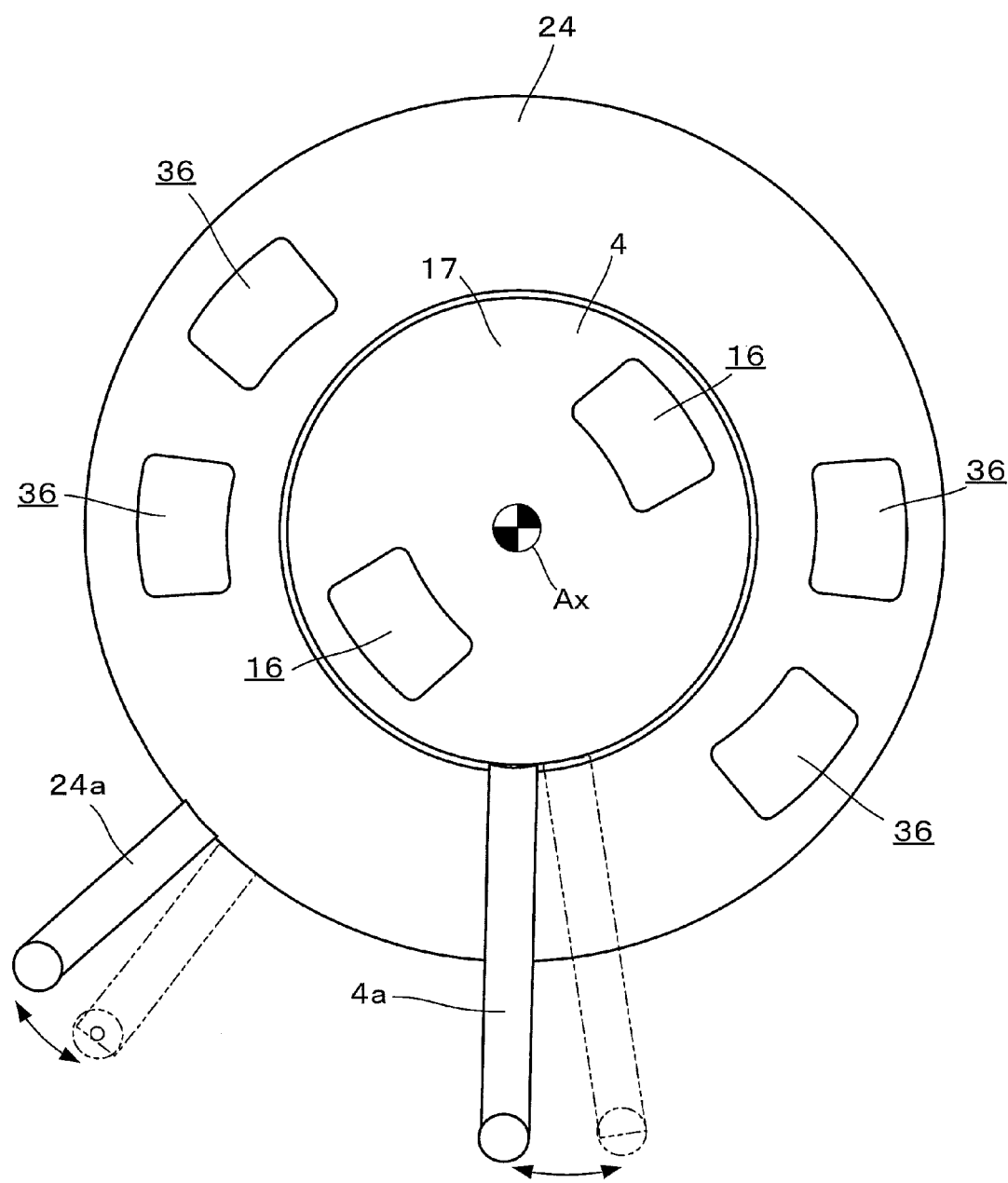
FIG. 2 is a diagram showing an inside selector plate and an outside selector plate.

As shown in FIG. 2, in the inside selector plate 4, a plurality of inside apertures 16 are formed so as to have the same phase as the inside pawl members 11 respectively, the plurality of inside apertures 16 being arranged in a circumferential direction, and each inside aperture 16 allowing a part of the protruding inside pawl member 11 to pass through the aperture 16. A rotational position of the inside selector plate 4 is switchable between a lock position shown in FIG. 3 and a release position shown in FIG. 4. At the lock position, the inside pawl member 11 passes through the inside aperture 16 of the inside selector plate 4 so as to engage with the inside recess 15 of the inside notch plate 3. At the release position, the tip section 11b of the inside pawl member 11 abuts against a non-formation portion 17 of the inside selector plate 4 where no inside aperture 16 is formed thereby the protrusion of the inside pawl member 11 is restricted, and the inside pawl member 11 is possible to be kept in a state that the inside pawl member 11 is housed in the inside pocket plate 2 side.

As shown in FIGS. 1 and 2, the inside selector plate 4 is provided with a drive arm 4a extending in a radial direction of the inside selector plate 4. By driving the drive arm 4a by a drive device not illustrated, the rotational position of the inside selector plate 4 is switched. Thereby, with respect to the inside clutch elements Ci, the operation mode is selectable between a lock mode and a release mode. In the lock mode, there are switchable two states: a state that in a case where the inside notch plate 3 is rotating in a rotational direction Ra, a torque transmission from the inside notch plate 3 to the inside pocket plate 2 is allowed; and another state that in a case where the inside notch plate 3 is rotating in a rotational direction Rb opposite to the rotational direction Ra, the torque transmission is blocked. In the release mode, the torque transmission from the inside notch plate 3 to the inside pocket plate 2 is blocked in both cases of the rotational directions Ra and Rb.

The outside clutch elements Co have a similar function to the above mentioned inside clutch elements Ci. As shown in FIGS. 1, 2, 5 and 6, the outside clutch elements Co are located at the outer circumferential side of the inside pocket plate 2 and disposed on the same axial line as the inside pocket plate 2 and the inside notch plate 3. The outside clutch elements Co include: an outside pocket plate 22 provided integrally with the inside pocket plate 2; an outside notch plate 23 provided to be in the hollow shape; and an outside selector plate 24 provided to be in the hollow shape and rotatably around the axial line Ax. The outside notch plate 23 is disposed at the outer circumferential side of the inside notch plate 3 and disposed on the axial line shared with the outside pocket plate 22. The outside selector plate 24 is disposed at the outer circumferential side of the inside selector plate 4 and also disposed between the outside pocket plate 22 and the outside notch plate 23. The outside pocket plate 22 corresponds to a first outside plate of the present invention, and the outside notch plate 23 corresponds to a second outside plate of the present invention.

Figure 5:
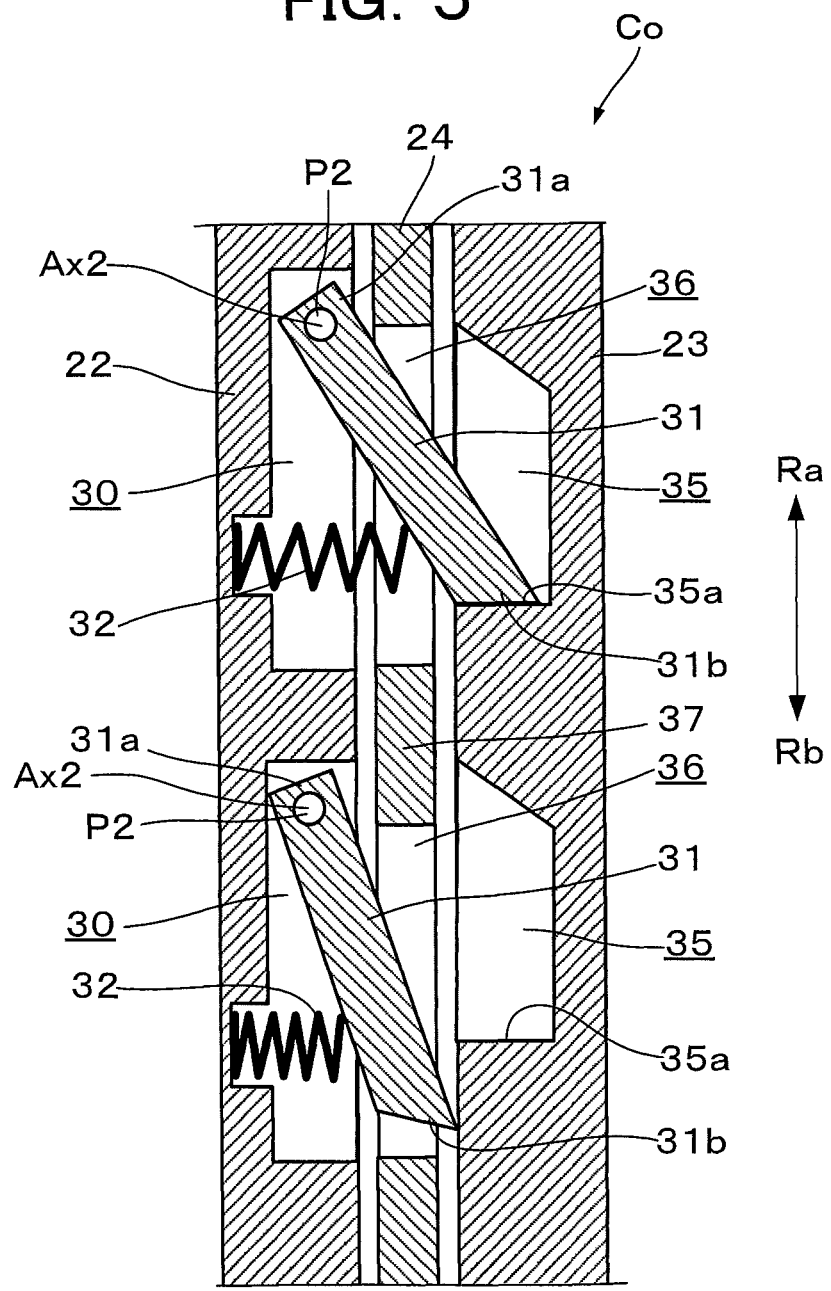
FIG. 5 is a sectional view with respect to a line V-V shown in FIG. 1 at the time of a lock mode of outside clutch elements.
Figure 6:
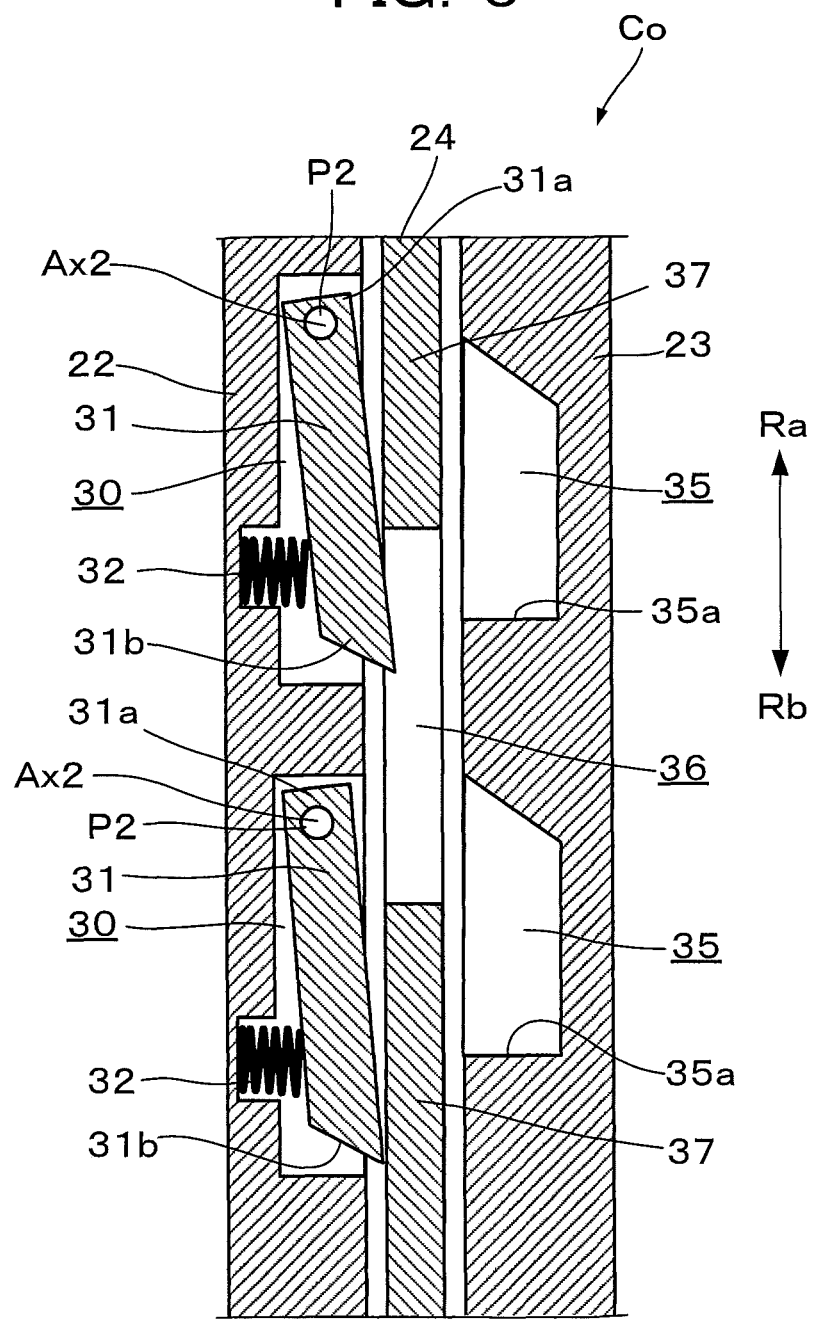
FIG. 6 is a sectional view with respect to the line V-V shown in FIG. 1 at the time of a release mode of the outside clutch elements.

As shown in FIGS. 5 and 6, on outside pocket plate 22, a plurality of outside holding pockets 30 are formed, the plurality of outside holding pockets 30 opening at the side facing the outside notch plate 23, and being arranged in a circumferential direction. For each of the plurality of outside holding pockets 30, a single outside pawl member 31 which engages with the outside notch plat e 23 is provided. Each of the outside pawl members 31 is provided via a spindle P2 on the outside pocket plate 22 so that a base end section 31a is allowed to rotate around an axial line Ax2 extending in a radial direction of the outside pocket plate 22. Also, each of the outside pawl members 31 is biased by a spring 32 in a protrusion direction heading to the outside notch plate 23 side. Thereby, each of the outside pawl members 31 is capable of moving between a state that the outside pawl member 31 backs to an outside pocket plate 22 side and housed in the outside holding pocket 30 and a state that the outside pawl member 31 protrudes toward the outside notch plate 23 from the outside pocket plate 22. That is, each of the outside pawl members 31 is provided to the outside pocket plate 22 protrudably.

On the outside notch plate 23, a plurality of outside recesses 35 are formed, the plurality of outside recesses 35 opening at the side facing the outside pocket plate 22 and being arranged in a circumferential direction. Each of the plurality of outside recesses 35 has a wall portion 35a, where a tip section 31b of the outside pawl member 31 abuts when the outside recess 35 engages with the outside pawl member 31 which is protruding. In each figure, the outside recesses 35 are not shown accurately in the number thereof. However, the number of outside recesses 35 is more than the number of outside pawl members 31. A phase of each outside recess 35 and a phase of each outside pawl member 31 are different from each other. Accordingly, a part of the protruding outside pawl members 31 engage with a part of the outside recesses 35 (See FIG. 5).

As shown in FIG. 5, in the outside selector plate 24, a plurality of outside apertures 36 are formed so as to have the same phase as the outside pawl members 31 respectively, the plurality of outside apertures 36 being arranged in a circumferential direction, and each outside aperture 36 allowing a part of the protruding outside pawl member 31 to pass through the aperture 36. A rotational position of the outside selector plate 24 is switchable between a lock position shown in FIG. 5 and a release position shown in FIG. 6. At the lock position, the outside pawl member 31 passes through the outside aperture 36 of the outside selector plate 24 so as to engage with the outside recess 35 of the outside notch plate 23. At the release position, the tip section 31b of the outside pawl member 31 abuts against a non-formation portion 37 of the outside selector plate 24 where no outside aperture 36 is formed, thereby the protrusion of the outside pawl member 31 is restricted, and the outside pawl member 31 is possible to be kept in a state that the outside pawl member 31 is housed in the outside pocket plate 22 side.

As shown in FIGS. 1 and 2, the outside selector plate 24 is provided with a drive arm 4a extending in a radial direction of the outside selector plate 24. By driving the drive arm 4a by a drive device not illustrated, the rotational position of the outside selector plate 24 is switched. Thereby, with respect to the outside clutch elements Co, the operation mode is selectable between a lock mode and a release mode. In the lock mode, there are switchable two states: a state that in a case where the outside notch plate 23 is rotating in a rotational direction Ra, a torque transmission from the outside notch plate 23 to the outside pocket plate 22 is allowed; and another state that in a case where the outside notch plate 23 is rotating in a rotational direction Rb opposite to the rotational direction Ra, the torque transmission is blocked. In the release mode, the torque transmission from the outside notch plate 23 to the outside pocket plate 22 is blocked in both cases of the rotational directions Ra and Rb.

According to the clutch 1 of the present embodiment, the inside and outside pocket plates 2 and 22, the inside and outside notch plates 3 and 23, and the inside and outside selector plates 4 and 24 are disposed concentrically. Accordingly, it is possible to make the inside clutch elements Ci and the outside clutch elements Co function independently of each other, without increase in size with respect to the axial direction. That is, the state of torque transmission with respect to at least two shafts disposed coaxially is possible to be changed by each of the set of inside clutch elements Ci and the set of outside clutch elements Co which are disposed concentrically. The clutch 1 does not accompany the increase in size with respect to the axial direction which would occur in a case where the two clutch elements are arranged in the axial direction. Therefore, the freedom degree of disposition with respect to the axial direction is improved.

Figure 7:
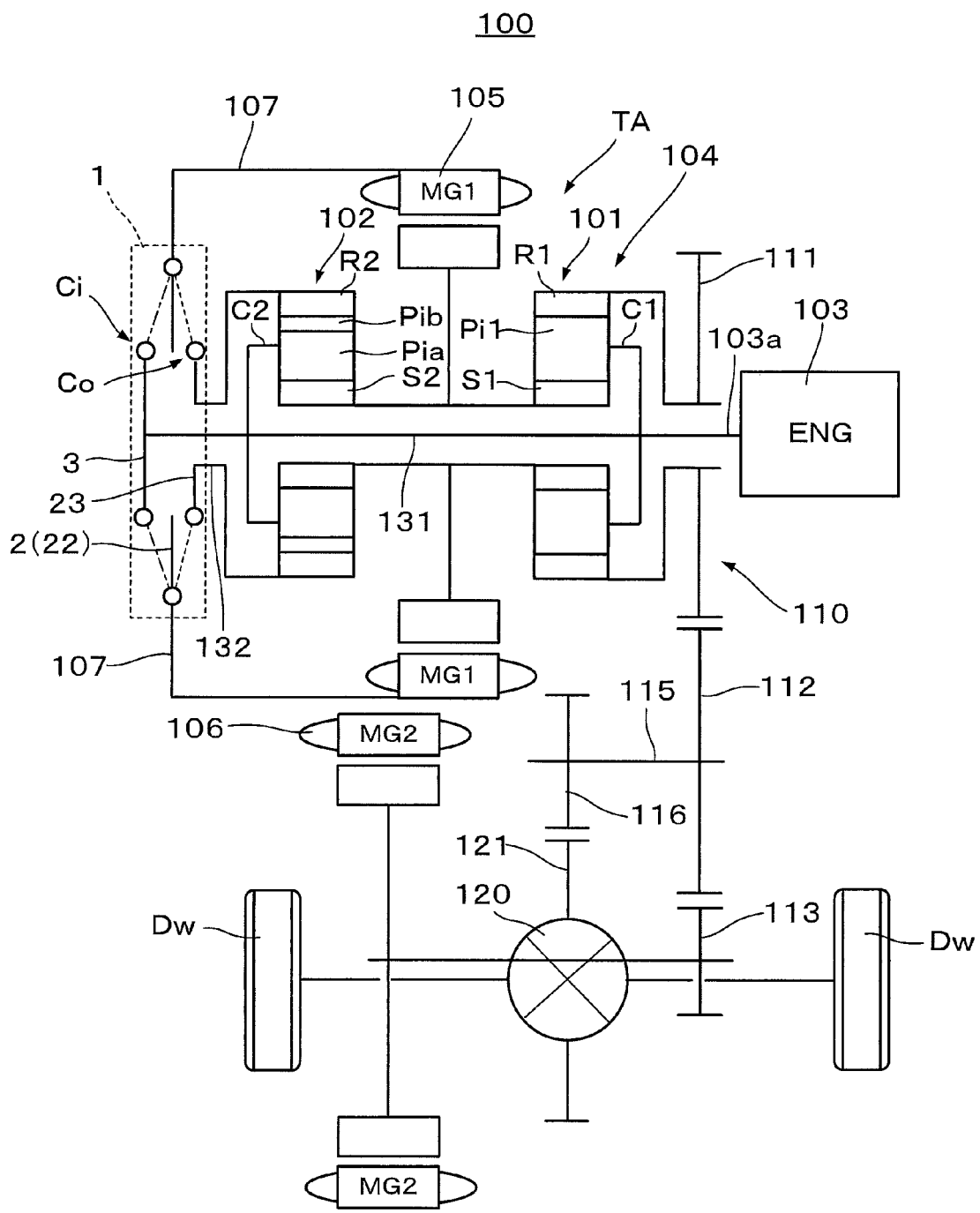
FIG. 7 is a pattern diagram showing a whole configuration of a hybrid vehicle to which the selectable one-way clutch of FIG. 1 is applied.

Next, an application example of the clutch 1 will be explained in reference to FIG. 7. As shown in FIG. 7, the clutch 1 is used by being built in a hybrid transaxle TA of a hybrid vehicle 100 (hereinafter, referred to as the transaxle TA). The transaxle TA comprises a power split mechanism 104; two motor generators 105 and 106; and a case 107. The power split mechanism 104 is configured in such a manner that a single pinion first planetary gear mechanism 101 and a double pinion second planetary gear mechanism 102 are combined, and splits the power of an internal combustion engine 103. The case 107 houses: the power split mechanism 104; the motor generators 105 and 106; and the other transmission elements. The first planetary gear mechanism 101 has: a sun gear S1; a ring gear R1; and a carrier C1 which holds pinions Pi1 engaging with the sun gear S1 and the ring gear R1 so that the pinions Pi1 rotate and also pivot. The second planetary gear mechanism 102 has: a sun gear S2; a ring gear R2; and a carrier C2 which holds first pinions Pia engaging with the sun gear S2 and second pinions Pib engaging with the ring gear R2 so that the pinions Pia and Pib rotate and also pivot in a state that each first pinion Pia and each second pinion Pib engage with each other.

The power split mechanism 104 is configured in such a way that the sun gear S1 of the first planetary gear mechanism 101 and the sun gear S2 of the second planetary gear mechanism 102 are connected with each other, and also the carrier C1 of the first planetary gear mechanism 101 and the carrier C2 of the second planetary gear mechanism 102 are connected with each other. Thereby, the power split mechanism 104 has four rotational elements which rotate differentially from each other. A crank shaft 103a of the internal combustion engine 103 is connected with the carriers C1 and C2, and the first motor generator 105 is connected with the sun gears S1 and S2. The torque outputted from the ring gear R1 of the first planetary gear mechanism 101 is transmitted to an output portion 110 which outputs the torque to drive wheels Dw.

The output portion 110 includes a drive gear 111 which rotates integrally with the ring gear R1 and a driven gear 112 which engages with the drive gear 111. The driven gear 112 engages with a motor gear 113 to which the torque of the second motor generator 106 is outputted. Further, the driven gear 112 has a gear shaft 115 where an intermediate gear 116 is fixed. The intermediate gear 116 engages with a ring gear 121 of a differential mechanism 120 which divides the torque into the right and left drive wheels Dw.

The two carriers C1 and C2 of the power split mechanism 104 are connected with a connection shaft 131. The connection shaft 131 is disposed coaxially with a hollow transmission shaft 132 which rotates integrally with the ring gear R2. The clutch 1 intervenes between the connection shaft 131 and the transmission shaft 131 which are disposed coaxially and the case 107, and functions as a brake which fixes selectively either the shaft 131 or the shaft 132 to the case 107. The inside clutch elements Ci of the clutch 1 intervene between the connection shaft 131 and the case 107, and the outside clutch elements Co intervene between the transmission shaft 132 and the case 107. As schematically shown in FIG. 7, the inside pocket plate 2 and outside pocket plate 22 of the clutch 1 are fixed to the case 107. The inside notch plate 3 is fixed to the connection shaft 131. The outside notch plate 23 is fixed to the transmission shaft 132. (See also FIG. 1)

Figure 8A:
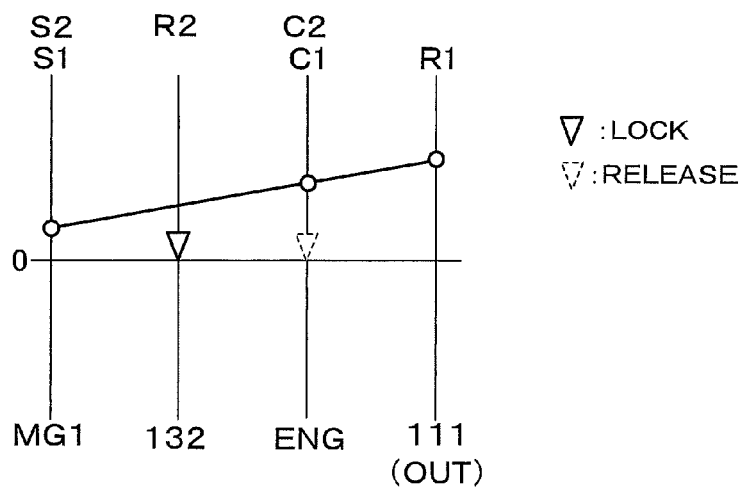
FIG. 8A is a velocity diagram of a continuously variable transmission state.
Figure 8B:
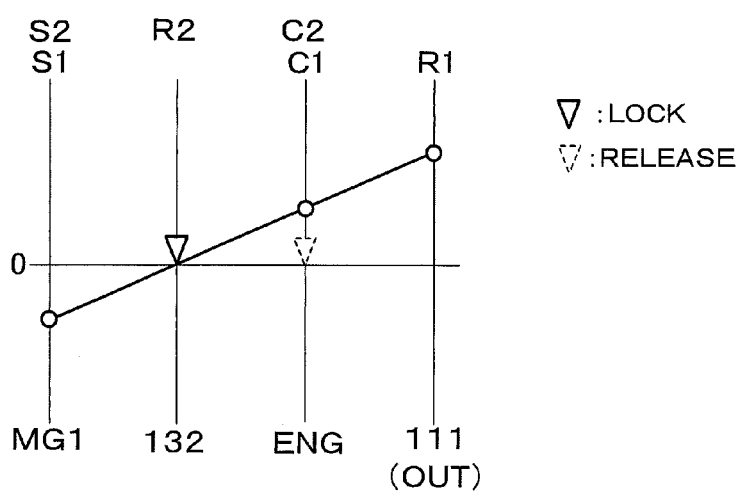
FIG. 8B is a velocity diagram of a high-gear locked state.
Figure 8C:
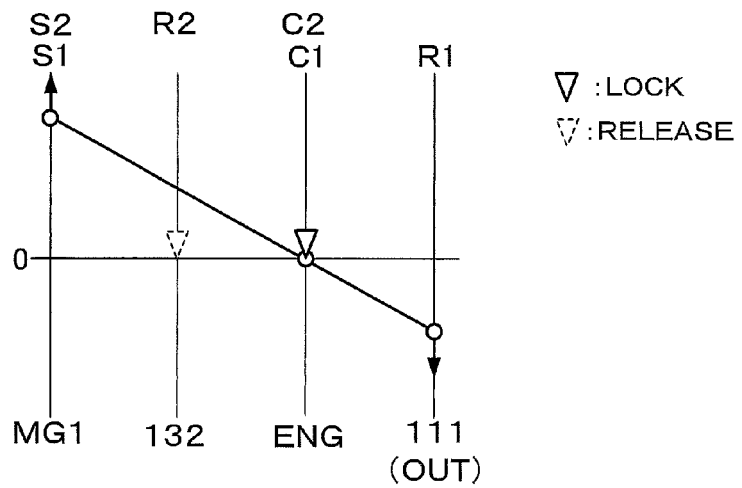
FIG. 8C is a velocity diagram of an engine locked state.

As conceptually shown in FIG. 7, when the inside clutch elements Ci and outside clutch elements Co of the clutch 1 are switched to the release mode respectively, both of the connection shaft 131 and the transmission shaft 132 go into a released state as shown by solid lines, the vehicle 100 becomes an electrical continuously variable transmission state using the first planetary gear mechanism 101. The velocity diagram of each rotational element of the continuously variable transmission state is shown in FIG. 8A. As shown by broken lines, when the inside clutch elements Ci are switched to the release mode and also the outside clutch elements Co are switched to the lock mode, the vehicle 100 becomes a high-gear locked state where while the connection shaft 131 is released, it is locked to rotate the transmission shaft 132 in one direction to inhibit the rotation of the ring gear R2, which is a high gear, in one direction. The velocity diagram of each rotational element in this state is shown in FIG. 8B. Further, as shown by long dashed short dashed lines, when the inside clutch elements Ci are switched to the lock mode and the outside clutch elements Co are switched to the release mode, the vehicle 100 becomes an engine locked state where while the transmission shaft 132 is released, it is locked to rotate the connection shaft 131 in one direction to inhibit the rotation of the internal combustion engine 3 in one direction. The velocity diagram of each rotational element in this state is shown in FIG. 8C.

In the clutch 1, by changing the mode of the set of inside clutch elements Ci and the mode of the set of outside clutch elements Co independently of each other, it is possible to change, without increase in size with respect to the axial direction, the states of torque transmission of the connection shaft 131 and transmission shaft 132 which are disposed coaxially. Thereby, it is possible to realize the switching of torque transmission in the transaxle TA with space saved.

The present invention is not limited to the above mentioned embodiment, and can be executed in various embodiments within the subject matter of the present invention. In the above embodiment, the inside pocket plate 2 and the outside pocket plate 22 are configured integrally. However, the present invention may be executed in an embodiment that those pocket plates are configured in a physically separable manner. The application example shown in FIG. 7 is just one example, and it is possible to apply the present invention into various apparatuses. In the application example of FIG. 7, both of the inside pocket plate 2 and the outside pocket plate 22 are used in a fixed state. However, the present invention may be executed in an embodiment where those pocket plates are connected with rotational elements respectively. To sum up, the following embodiment is also possible. The clutch of the present invention is set to intervene between the rotational elements in order to change the state of torque transmission between rotational elements.

EXPLANATION OF REFERENCES

1 a clutch
2 an inside pocket plate (a first inside plate)
3 an inside notch plate (a second inside plate)
4 an inside selector plate
11 an inside pawl member
15 an inside recess
16 an inside aperture
22 an outside pocket plate (a first outside plate)
23 an outside notch plate (a second outside plate)
24 an outside selector plate
31 an outside pawl member
35 an outside recess
36 an outside aperture

The invention claimed is:

1. A selectable one-way clutch comprising inside clutch elements and outside clutch elements,
   the inside clutch elements including a first inside plate and a second inside plate which are disposed on a shared axial line with each other, and the inside clutch elements being switchable between a lock mode where torque transmission from the second inside plate to the first inside plate is allowed in a case where a rotational direction of the second inside plate is a predetermined direction and the torque transmission is blocked in a case where the rotational direction is an opposite direction to the predetermined direction; and a release mode where the torque transmission from the second inside plate to the first inside plate is blocked in either case where the rotational direction of the second inside plate is the predetermined direction or the opposite direction, and
   the outside clutch elements including a first outside plate and a second outside plate which is in a hollow-shape, the first outside plate being located on an outer circumferential side of the first inside plate; disposed on the shared axial line; and provided integrally or disintegrally with the first inside plate, and the second outside plate being located on an outer circumferential side of the second inside plate; and disposed on the shared axial line, and the outside clutch elements being switchable between a lock mode where torque transmission from the second outside plate to the first outside plate is allowed in a case where a rotational direction of the second outside plate is the predetermined direction and the torque transmission is blocked in a case where the rotational direction is the opposite direction to the predetermined direction; and a release mode where the torque transmission from the second outside plate to the first outside plate is blocked in either case where the rotational direction of the second outside plate is the predetermined direction or the opposite direction, wherein
   the inside clutch elements and the outside clutch elements are disposed coaxially using the shared axial line as a center
   wherein the second outside plate is rotatable independently of the second inside plate, and
   wherein the second inside plate is fixed to a first shaft and the second outside plate is fixed to a second shaft which is disposed coaxially with the first shaft.

2. The selectable one-way clutch according to claim 1, wherein
   the inside clutch elements further include at least one inside pawl member and an inside selector plate,
   the inside pawl member being provided on the first inside plate protrudably toward the second inside plate from the first inside plate, and engaging with an inside recess formed on the second inside plate only when the second inside plate rotates in the predetermined direction, in a case where the inside pawl member protrudes from the first inside plate, and
   the inside selector plate being disposed between the first inside plate and the second inside plate; having at least one inside aperture which allows the inside pawl member to pass through the inside aperture; and being capable of rotating relatively to the first inside plate between a lock position where the inside pawl member is allowed to engage with the inside recess of the second inside plate by passing through the inside aperture and a release position where the inside pawl member is kept in a state that the inside pawl member is housed in a side of the first inside plate.

3. The selectable one-way clutch according to claim 1, wherein
   the outside clutch elements further include at least one outside pawl member and an outside selector plate which is in a hollow-shape, the outside pawl member being provided on the first outside plate protrudably toward the second outside plate from the first outside plate, and engaging with an outside recess formed on the second outside plate only when the second outside plate rotates in the predetermined direction, in a case where the outside pawl member protrudes from the first outside plate, and the outside selector plate being disposed at an outer circumferential side of the inside selector plate and also disposed between the first outside plate and the second outside plate; having at least one outside aperture which allows the outside pawl member to pass through the outside aperture; and being capable of rotating relatively to the first outside plate between a lock position where the outside pawl member is allowed to engage with the outside recess of the second outside plate by passing through the outside aperture and a release position where the outside pawl member is kept in a state that the outside pawl member is housed in a side of the first outside plate.

4. The selectable one-way clutch according to claim 1, wherein the inside clutch elements further include at least one inside pawl member and an inside selector plate, the inside pawl member being provided on the first inside plate protrudably toward the second inside plate from the first inside plate, and engaging with an inside recess formed on the second inside plate only when the second inside plate rotates in the predetermined direction, in a case where the inside pawl member protrudes from the first inside plate, and the inside selector plate being disposed between the first inside plate and the second inside plate; having at least one inside aperture which allows the inside pawl member to pass through the inside aperture; and being capable of rotating relatively to the first inside plate between a lock position where the inside pawl member is allowed to engage with the inside recess of the second inside plate by passing through the inside aperture and a release position where the inside pawl member is kept in a state that the inside pawl member is housed in a side of the first inside plate, and the outside clutch elements further include at least one outside pawl member and an outside selector plate which is in a hollow-shape, the outside pawl member being provided on the first outside plate protrudably toward the second outside plate from the first outside plate, and engaging with an outside recess formed on the second outside plate only when the second outside plate rotates in the predetermined direction, in a case where the outside pawl member protrudes from the first outside plate, and the outside selector plate being disposed at an outer circumferential side of the inside selector plate and also disposed between the first outside plate and the second outside plate; having at least one outside aperture which allows the outside pawl member to pass through the outside aperture; and being capable of rotating relatively to the first outside plate between a lock position where the outside pawl member is allowed to engage with the outside recess of the second outside plate by passing through the outside aperture and a release position where the outside pawl member is kept in a state that the outside pawl member is housed in a side of the first outside plate.

* * * * *